June 26, 1928.
A. C. KAPLAN
1,675,106
AUTOMOBILE WRECKING CLAMP
Filed June 25, 1925
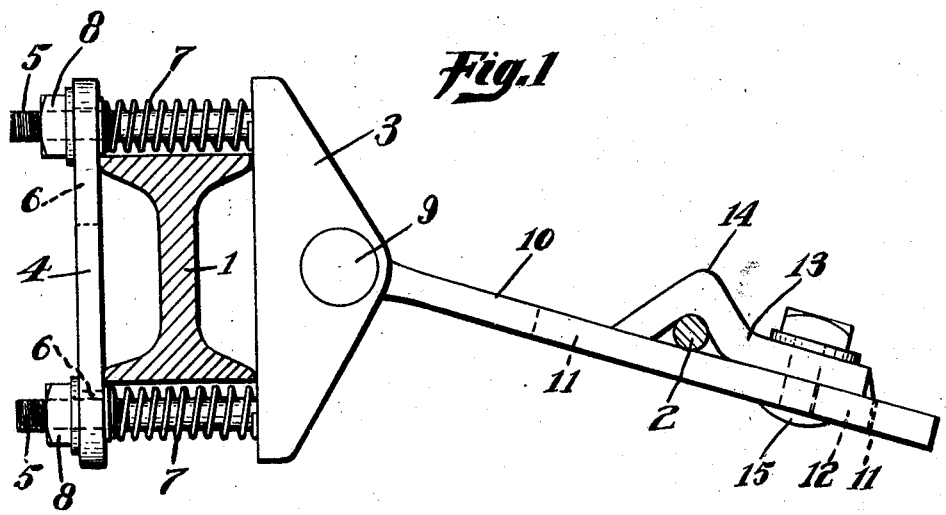
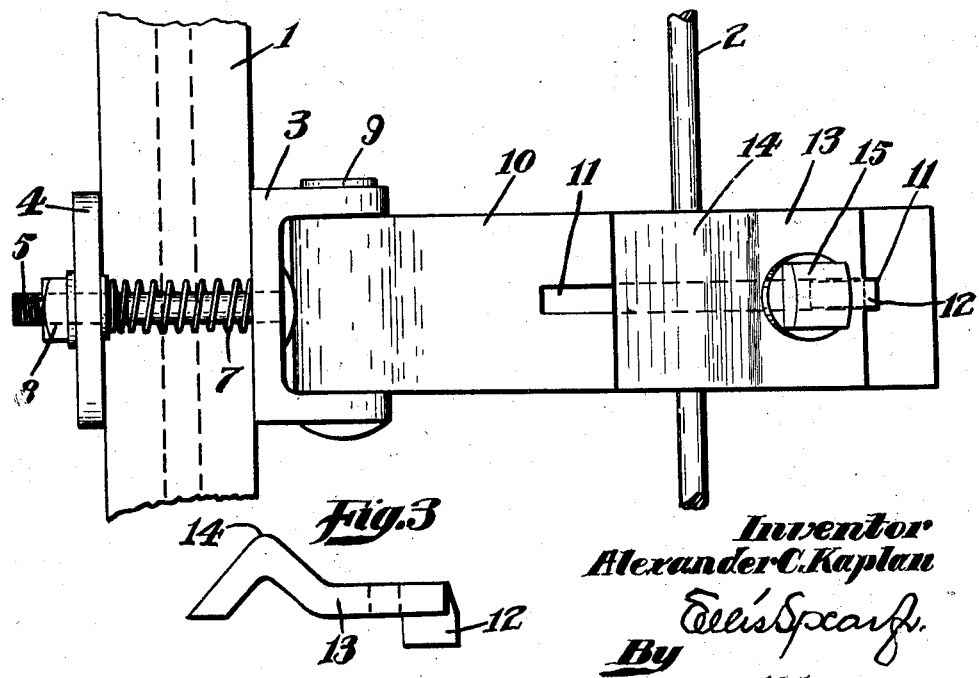
Inventor
Alexander C. Kaplan
By Ellis Spear Jr.
Attorney Patented June 26, 1928.

UNITED STATES PATENT OFFICE.

ALEXANDER C. KAPLAN, OF ROXBURY, MASSACHUSETTS.

AUTOMOBILE WRECKING CLAMP.

Application filed June 25, 1925. Serial No. 39,603.

This invention relates to towing appliances for automobiles, and consists in the novel construction, combination and relation of parts described and illustrated in the accompanying specification and drawings, and particularly pointed out in the appended claims.

My device is especially intended for towing use where the rear end of an automobile has broken down. The usual practice is to jack up the rear wheels and tow the crippled car backwards with its front wheels, however, running on the ground. The steering of a car towed in this manner presents considerable difficulty, and it is therefore the object of my invention to provide a simple, quick-detachable device adapted to be connected with the steering gear of the towed car which will overcome this difficulty.

This object, together with certain other features of advantage, is secured in the device of the present invention. The construction and operation of a characteristic embodiment of my device will now be described, reference being had to the accompanying drawings wherein like reference numerals designate corresponding parts, and in which:

Fig. 1 is an edge view of a towing appliance in accordance with my invention attached to the front axle and steering rod of an automobile.

Fig. 2 is a plan view thereof, and

Fig. 3 is a detail of the steering rod clamp.

I have indicated at 1 the front axle and at 2 the usual steering rod which connects the steering knuckles of an automobile.

My towing appliance consists of a pair of spaced axle clamping members 3 and 4 adapted to straddle the axle 1, as shown in Fig. 1, and adjustably connected to each other by a pair of bolts 5 which engage the top and bottom faces of the axle when the device is applied thereto. The heads of the bolts are lodged in the member 3 and the member 4 is longitudinally slotted, as indicated at 6, 6, to receive the free ends of said bolts. Coiled about the bolts between the members 3 and 4 is a pair of compression springs 7, and the free ends of the bolts are provided with wing or other clamp nuts 8 by means of which the member 4 may be set up against the axle.

This construction permits snug application of the clamp to axles of varying sizes quickly and with the maximum ease.

The member 3 is formed as a yoke to the ears of which is pivoted centrally thereof at 9 a steering rod clamping bar 10. The bar 10 is longitudinally slotted towards its free end, as indicated at 11, and playing in this slot is the downturned heel 12 of an adjustable clamping piece 13, the toe end of which is bent angularly upon itself, as indicated at 14, to define with the underlying bar 10, an open-ended recess within which the steering rod 2 is lodged. The adjustment of the clamping piece 13 in the slot 11 is held by a clamping bolt 15.

In use, the axle clamps 3 and 4 are fitted to the axle and the clamping piece 13 adjusted longitudinally in the slot 11 until its V-shaped portion 14 engages and clamps the steering rod 2 against the underlying bar 10. The pivotal connection at 9 allows a certain amount of vertical play so that the device can automatically accommodate itself to road irregularities, as well as some latitude in adjusting the device to the axles and steering rods of the different makes of cars, and this adjustment plus the adjustment allowed by the axle clamps 3 and 4 and the steering rod clamps 10 and 13 makes the device practically universally adaptable.

Various modifications in the form and arrangement of parts may obviously be resorted to within the limits of the appended claims.

What I therefore claim and desire to secure by Letters Patent is:

1. A towing appliance for the front end of an automobile, comprising a pair of axle clamping members adapted to straddle the front axle and adjustably connected to each other above and below the axle, one of said members formed as a yoke, a steering rod clamping lock pivoted at one end in said yoke, and a cooperating steering rod clamping lock mounted on said first-named steering rod clamping lock adjacent the outer end thereof for adjustment independently thereof and independently of the adjustment of the axle clamps.

2. A towing appliance for the front end of an automobile, comprising a pair of adjustable axle clamping members adapted to straddle the axle, bolts connecting said clamps above and below the axle, springs coiled about said bolts between said clamps, one of said clamps being formed as a pivot bearing, and a pair of adjustable steering rod clamps, one of which is pivoted in said bearing.

3. A towing appliance for the front end of an automobile, comprising a pair of adjustable axle clamping members adapted to straddle the axle, bolts connecting said clamps above and below the axle, springs coiled about said bolts between said clamps, one of said clamps being formed as a pivot bearing, a steering rod clamp pivoted in said bearing, and a cooperating clamp adjustably mounted on said pivoted clamp for adjustment independently thereof and effective therewith to clamp the steering rod therebetween.

4. A towing appliance for the front end of an automobile, comprising an adjustable axle clamp, a steering rod clamping bar pivoted thereto and a cooperating clamp adjustable longitudinally of said bar independently thereof and having an angularly bent portion defining with said bar an open-ended recess for the reception of the steering rod.

5. A towing appliance for the front end of an automobile, comprising an adjustable axle clamp, a steering rod clamping bar pivoted thereto and having a longitudinally extending slot, a cooperating clamping piece adjustable independently of said bar and having a downturned heel disposed in said slot and having an angularly bent portion defining with said bar an open-ended recess for the reception of the steering rod and means for holding the adjustment of said clamping piece in said slot.

6. A towing appliance for the front end of an automobile, comprising a pair of adjustable axle clamping members adapted to straddle the axle, bolts connecting said clamps above and below the axle, springs coiled about said bolts between said clamps, one of said clamps being formed as a pivot bearing, a steering rod clamp pivoted in said bearing and having a longitudinally extending slot, a cooperating clamping piece adjustable independently of said steering rod clamp and having a downturned heel disposed in said slot and having an angular bent portion defining with said pivoted steering rod clamp, an open-ended recess for the reception of the steering rod, and means for holding the adjustment of said clamping piece in said slot.

In testimony whereof I affix my signature.

ALEXANDER C. KAPLAN.